Feb. 25, 1969     R. G. KIRKPATRICK     3,429,221
CONSTANT VELOCITY CONVEYOR MECHANISM
Filed Dec. 18, 1967                         Sheet 1 of 3

INVENTOR:
ROBERT G. KIRKPATRICK,
BY Harry C. Burgess
HIS ATTORNEY.

INVENTOR:
ROBERT G. KIRKPATRICK,

BY *Harry C. Burgess*

HIS ATTORNEY.

United States Patent Office 3,429,221
Patented Feb. 25, 1969

3,429,221
CONSTANT VELOCITY CONVEYOR MECHANISM
Robert G. Kirkpatrick, Shelburne, Vt., assignor to General
Electric Company, a corporation of New York
Filed Dec. 18, 1967, Ser. No. 691,478
U.S. Cl. 89—33      4 Claims
Int. Cl. F41d *9/02;* F41c *25/10*

ABSTRACT OF THE DISCLOSURE

An improved conveyor mechanism for transferring rounds of ammunition between a high rate of fire automatic weapon, such as a modern "Gatling-gun," and an ammunition storage device, the conveyor mechanism including a flexible, endless belt comprising a plurality of round-carrying elements pivotally linked together on opposite sides of a cartridge or round pocket, wherein the round centerline is vertically displaced from the centerlines through linking pins at each side of the pocket, a pair of drive sprockets, and wherein guide means for the conveyor belt hold the pin connection centerlines at an effective constant radial distance from the center of the drive sprockets so as to cause the conveyor belt to follow a constant and defined geometric path about the sprocket centerline while maintaining a constant linear velocity as well as a constant angular velocity with respect to sprocket drive shaft r.p.m.

BACKGROUND OF THE INVENTION

The present invention has application to the field of ordnance and armaments and, in particular, concerns improvements to ammunition handling devices. Specifically, it relates to an endless or linked belt conveyor mechanism for moving rounds of ammunition from a storage device to a high rate of fire automatic weapon of the "Gatling-gun" variety.

Typical of the prior art ammunition handling or supply systems is that shown in U.S. Patent 2,542,200 where an endless chain comprising a plurality of clips, which support rounds or cartridges, is movable between an ammunition storage area and a weapon-mounted transfer mechanism. These belts are driven by sprockets or drive wheels having peripheral teeth which intermittently engage the chain to impart linear movement thereto. The ammunition round carrying elements are attached or integral with the belt links. Typically, the individual links of the belt are joined or pivotally connected together by pins and are guided by channel or other feeder housing guide means in their movement around the sprocket wheel centerlines. The sprockets, in turn, are connected through suitable gearing to electric or hydraulic drive motors. As a result of an inherent design deficiency of these prior art devices, as will become clear as my invention is explained hereinafter in detail, it has been necessary to remove the ammunition from the endless chain or belt at a horizontal location. That is, the rounds are not practicably removable at the point at which the round is moving around the periphery of the sprocket wheel. This circumstance is illustrated in the aforementioned patent and further in U.S. Patents 1,332,060 and 1,552,863. In modern day high rate of fire mechanisms for use in military and airborne vehicles where size and weight are at a premium it is highly desirable to be able to load the round into and/or remove it from the conveyor element while the element is located in the peripheral area of the sprocket wheels at both the entrance and exit ends of the conveyor mechanism. It would also be desirable to have more uniform movement or velocity of the linked belt or conveyor as it moves along in the guide means. That is to say, it would be preferable if the relative distances between adjacent individual links or elements could be maintained along a path or line parallel to an imaginary line connecting the parallel drive shafts of the entrance and exit sprockets. It is also desirable to minimize up and down movement of elements in this path so as to eliminate acceleration and deceleration of the linked elements as they approach engagement with the wheel sprockets at the entrance and exit ends of the conveyor mechanism.

Accordingly, a primary object of the subject invention is to provide an improved conveyor mechanism for ammunition handling wherein the conveyor mechanism provides uniform movement of ammunition rounds along a defined geometrical path, as well as constant, uniform movement of the round carrying elements.

A further object of the subject invention is to provide an improved ammunition conveyor of linked belt design, wherein the geometrical round path is controlled such that the rounds move with constant velocity along the flat or horizontal portion of the path and the linked element connecting points move at a constant radial distance from the centerline of the conveyor belt drive mechanism in order that the overall path of the linked belt elements is smooth rather than an uncontrolled up and down motion depending on the rate of speed of the drive mechanism.

A further object of the subject invention is to provide an improved flexible linked belt ammunition conveyor mechanism, wherein the link or pin connections between individual belt elements are designed to minimize or eliminate variations in pitch between the element centerlines while permitting belt or conveyor flexibility without undesirable take up of slack in starting and piling up of elements in stopping the drive mechanism for the conveyor system.

SUMMARY OF THE INVENTION

Briefly, in a disclosed embodiment I provide an ammunition conveyor mechanism including an endless, linked belt driven by a pair of sprocket wheels between an ammunition storage area and an automatic weapon. The belt is comprised of a plurality of elements having semicircular round retaining pockets flanked on either side by laterally-extending ear means bored to accept connecting pins. The respective pin and round pocket centerlines follow parallel, vertically displaced nominally straight line paths, as the belt moves through a housing having guide means engaged with the elements in the vicinity of the sprocket wheels, whereby the guide means are structured to cause the round centerlines to move along a prescribed arcuate path, wherein the round movement is at a uniform rate about the sprocket wheel axis and the pin centerlines are maintained at a constant radial distance from said axis, thereby permitting unloading or loading of rounds in the area of the wheel periphery.

Further objects and advantages of my invention, while distinctly pointed out in the claims appended hereto, will be made more clear by reference to the following detailed description of a preferred form of the invention illustrated in the accompanying drawings of which:

Figure 2:
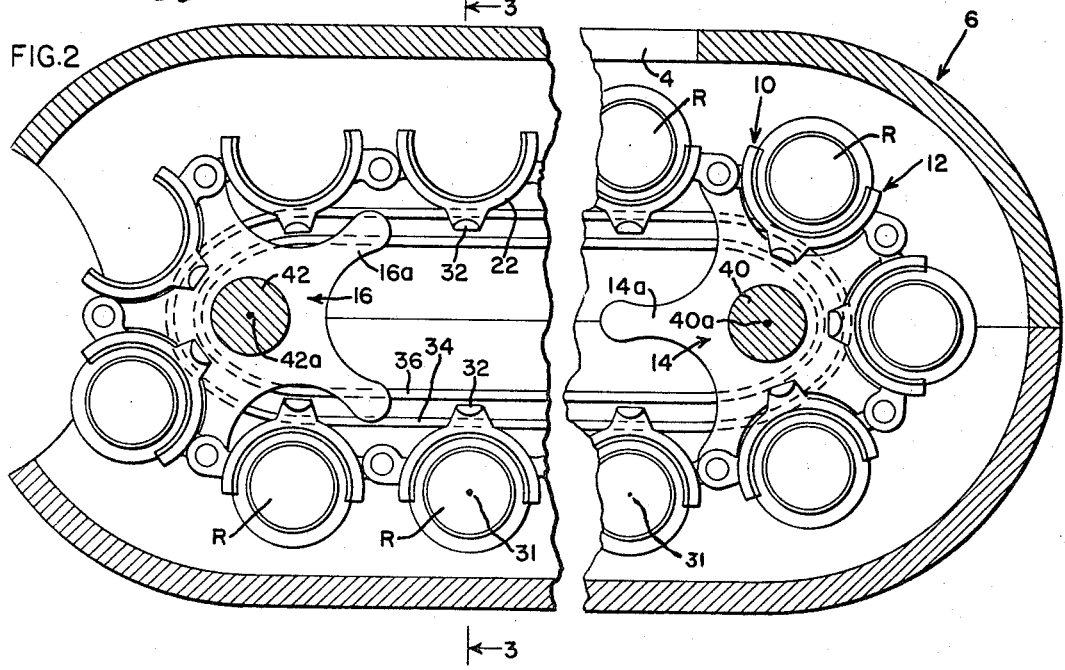
FIGURE 2 is an enlarged, foreshortened view of the conveyor mechanism housing and endless linked belt, partially in cross-section, illustrating further details of the round-carrying means.
Figure 3:
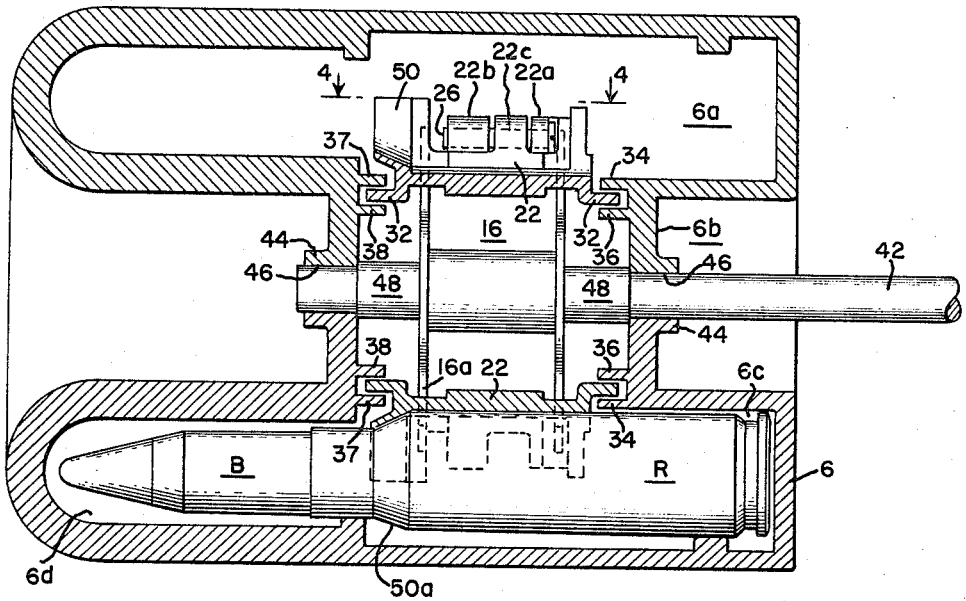
Figure 4:
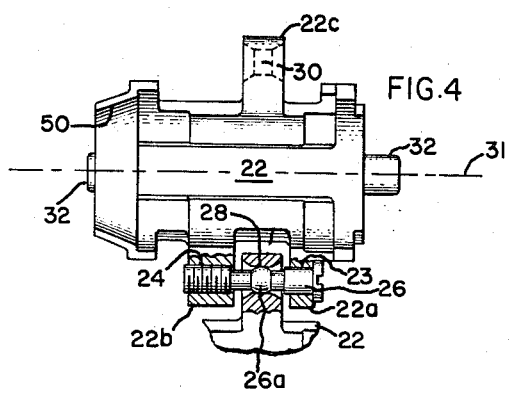
Figure 5:
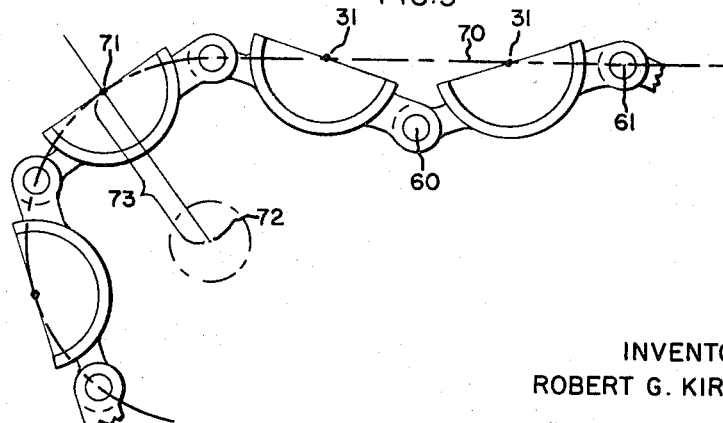
Figure 6:
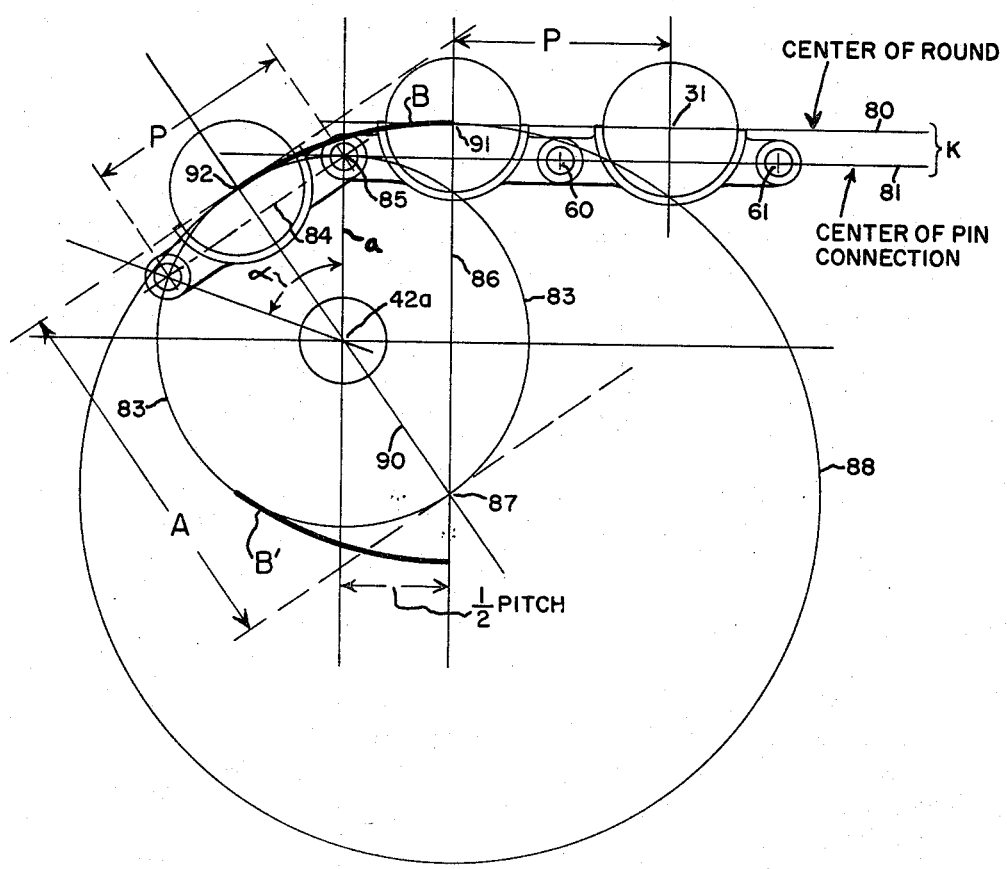

FIGURE 3 is a view taken along line 3 of FIGURE 2;
FIGURE 4 is a view taken along line 4 of FIGURE 3;
FIGURE 5 is a schematic drawing of the round path followed in prior art linked belt conveyor mechanism designs; and FIGURE 6 represents a two-dimensional schematic layout of the round path incorporated in the improved conveyor mechanism of the present invention.

DESCRIPTION OF THE INVENTION

Figure 1:
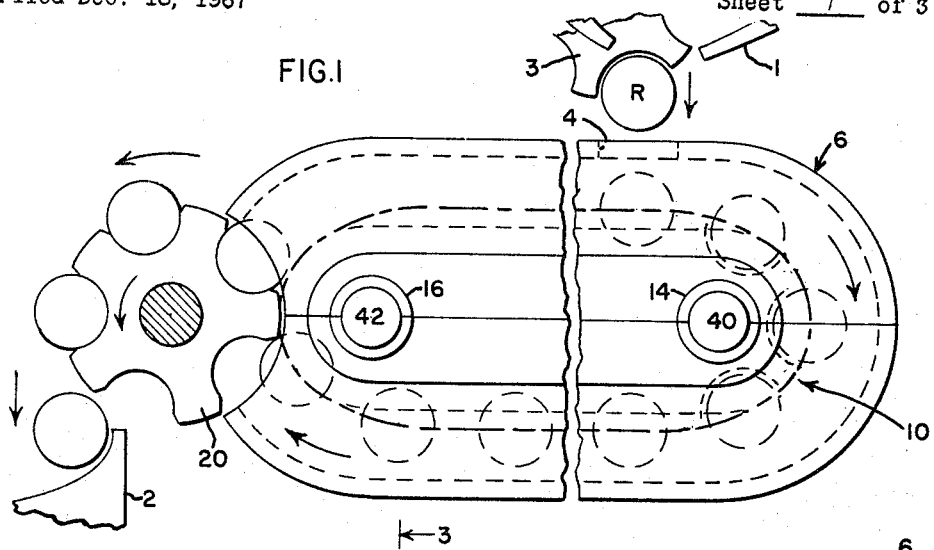
FIGURE 1 is a schematic of an ammunition handling system incorporating the improved conveyor mechanism of my invention.

Turning now to FIGURE 1 of the drawing, illustrated schematically therein is a conveyor mechanism for transferring ammunition between a storage area, indicated generally at 1, and a transfer mechanism, indicated generally at 2, located at and typically supported from the housing of the gun (not shown). In operation, a hand-off sprocket 3 delivers a round R to the conveyor mechanism through an opening 4 in the conveyor mechanism housing, which housing is indicated generally at 6. It will be understood that the length, size and relative dimensions of the conveyor housing are dictated primarily by the weapon system application and the arrangement shown is illustrative only. Typically, the housing will partially, or wholly, enclose an ammunition chute (not shown) surrounding an endless belt, indicated generally at 10, comprising a number of linked rounds R to be conveyed to the using weapon. The belt 10 is made up of a plurality of elements, indicated generally at 12, which elements are intermittently engaged by a pair of drive wheels or sprockets indicated generally at 14 and 16 having a plurality of teeth (sprockets) 14a and 16a, as seen in FIGURE 2. The drive sprockets, powered by suitable gearing connected to an electrical or hydraulic power supply means (not shown) drive the individual elements 12 of the endless belt 10, as explained in more detail hereinafter. When a round R reaches the vicinity of sprocket 16 it is captured at the exit end of the conveyor mechanism by a further hand-off wheel or sprocket 20, intermediate the conveyor housing 6 and the transfer mechanism 2 located on the gun, in accordance with a feature of my invention.

More specifically, it will be seen in FIGURES 2–4 that the conveyor belt link elements 12 have a body portion 22 of semi-circular configuration adapted to receive the cartridge case of the round R. Projecting laterally of either side of the semi-circular portion 22 are connecting means for linking the conveyor elements together comprising a first pair of ears 22a and 22b on one side of an element having a pair of concentric bores 23 and 24, respectively, therein and a third ear 22c on the opposite side. Bore 23 in ear 22a is smooth walled, while bore 24 is threaded to engage a pin, indicated generally at 26, as is more fully described hereinafter. Connecting ear 22c on the opposite side of the conveyor link element body portion 22 has a partially semicircular (in cross-section) bore, indicated generally at 30. The longitudinal axis of the opening 30 and the axis of the concentric bores 23 and 24 on the opposite side of each link are parallel and located on the same horizontal plane with respect to the overall body portion 22 of the link element as seen more clearly in FIGS. 1 and 2. This plane is displaced vertically of a plane containing the centerline 31 of the round pocket, as will be obvious from the drawings. Projecting outwardly along the centerline 31 of the round pocket are a pair of tabs 32 located at either end of the body portion, as shown more clearly in FIGURES 3 and 4. The external tabs 32 provide positive means for controlling the movement of the flexible conveyor belt 10 in the elongated housing 6. To this end, as shown in FIG. 3, the housing includes a plurality of continuous internal sidewalls or guide means comprising a first wall 34 projecting inwardly of the housing at the periphery of the first round handling cavity 6a. Located just inwardly of the wall 34 in the drawing is a second continuous wall indicated at 36. Walls 34 and 36 project laterally of an interconnecting or web portion of the housing indicated generally at 6b, located between and joining the first round handling cavity 6a and a second round handling cavity portion 6c in the conveyor housing. As shown clearly in FIG. 2, walls 34 and 36 are continuous around one side of the central or interconnecting portion 6b of the housing. Likewise, at the other side of the housing, or to the left in FIG. 3, are a similar pair of walls 37 and 38, respectively, which likewise capture the other external tab 32 of the pair of tabs at either extremity of the round pockets 22 of the linked elements. As shown in FIG. 1, at either end of the conveyor housing are located drive wheels or sprockets 14 and 16 supported on drive shafts 40 and 42, having centerlines (axes) indicated at 40a and 42a, respectively. These drive shafts pass through and are supported in the housing. For example, as indicated in FIG. 3, shaft 42 passes through a pad portion 44 of the intermediate section 6b of the housing having a central bore 46 provided therein, with suitable bearing means 48, for rotatably supporting sprocket wheel 16. External drive means (not shown) are connected to the shafts 40 and 42 to cause the sprocket wheels 14 and 16 to rotate and move the linked belt 10, as described more fully hereinafter. As also seen in FIGURE 4 the link elements include a conically-shaped forward section 50 adapted to engage a necked-down portion 50a of the round casing. Forward of the necked-down portion of the casing is the bullet portion B of the round adapted to be received in a cavity portion 6d of the housing 6 during movement of the rounds through the housing to the transfer sprocket 20. The primer end of the cartridge is likewise received and guided in housing cavity portion 6c located to the rear of the housing, as indicated in FIGURE 3.

Turning now to FIGURE 5 indicated therein is the path taken by the typical prior art linked belt as it approaches the exit sprocket end of the conveyor mechanism. It will be observed that the connecting pins 26 having centerlines (axes) located at 60 and 61, between the individual elements of the typical linked ammunition belt, follow an uncontrolled path essentially. In other words, as the elements approach engagement with the sprocket teeth this will tend to cause the belt 10 to buckle or move above and below the equivalent round path, indicated by the line 70 in FIGURE 5. Line 70 represents the nominal centerline of the pivot pin connections. With this arrangement it will be obvious from FIGURE 5 that the round centerline at point 71 is forced to follow a path at a constant radial distance form the centerline of the sprocket wheel at point 72. That is the radius indicated at 73 is maintained as the rounds move about the centerline of the wheel with the element securely engaged by the wheel sprocket. As the belt moves around the bend, to change direction 180°, the connecting pin 26 (point 60) directly ahead of the round not yet engaged pivots downward, which causes the connecting pin 61 behind this round to pivot upward, as indicated in FIGURE 5. It would be desirable, therefore, to provide means whereby the pins or connecting points 60 and 61 could be kept at a constant radial distance from the nominal centerline of the round path in the conveyor mechanism. If the path of the round could be made to follow a constant geometrical path the links would move at a constant linear velocity with respect to shaft r.p.m. It is in this way that my invention makes it more feasible to load rounds into, or remove rounds from, the linked belt while the round is at the sprocket periphery and traversing the 180° bend. This, in turn, makes possible a significant reduction in the size of the conveyor housing, as well as making it more feasible to control the movement of the rounds during hand-off to the transfer sprocket at the gun location. Otherwise, the handing-off procedure must be done in a flat portion of the round path, as is the case with known conveyor apparatus.

In achieving the improvement of the present invention I have discovered that it is possible to relate the distance between the nominal path of the centerlines 60, 61 of the pins 26 to the nominal path of the centerlines 31 of the rounds R, or the body portion 22 of the link elements. Given, therefore, a vertical separation of line 81 in FIGURE 6, representing the nominal path of the pin connections 60, 61 from line 82, representing the nominal path of the centerline 31 of the rounds, it is possible to achieve a much smaller overall housing and size, as well as a more controlled round path, as will now be described in detail. As will be seen in the schematic drawing of FIG. 6, the straight line path of the centerlines of the pin connections on each of the individual segments of the belt follow the path 81 which is separated by a dimension K (variable) from the nominal straight line path of the centerlines of the rounds in the flat portion of the conveyor system, or line 80 in FIG. 6. If this were not so, that is, if the points 60, 61 were not separated from point 31 by some distance K depending on round size, etc., but were on the same elevation the resultant "pitch diameter" of the sprocket wheel would have to be infinite to achieve the necessary flat arc to provide constant velocity about the centerline of the wheel drive shaft, as now described.

Indicated by dimension A in the schematic of FIG. 6 is the "pitch diameter" of sprocket wheel 16. "Pitch diameter" is defined as, twice the distance from the center of the opening between adjacent sprockets 16a to the center of the sprocket wheel (drive shaft) i.e., point 42a. Dimension A is also the diameter of a circle 83 having a chord 84 equal to dimension P. Dimension P is also defined as the distance between the centerlines 31 of adjacent rounds, or the "pitch" of the linked belt 10. More specifically, P is the distance between the connecting pin centers, indicated at 60 and 61 in the drawing. Belt pitch (dimension P, in this instance), is arbitrarily determined by matching the pitch of the sprocket wheels 14 and 16 to the pitch of the belt 10. The pitch of the sprockets (distance between sprocket centers), on the other hand, depends on the requirement for feeding a particular weapon at a particular feed velocity. For example, a typical high rate of fire, multi-barrel weapon currently in the military arsenal is fed 20 mm. shells with a sprocket wheel having a pitch of 1.616 inches between centers to achieve the desired match of the ammunition feeder sprocket wheel r.p.m. to the gun rotor r.p.m. Looking at it another way, the angle sub-tended by the chord P, i.e., angle $\alpha$ in the drawing, can be determined by dividing the number of sprockets on the drive wheel into 360°. In the disclosed embodiment there are five such sprockets (teeth) and, thus, angle $\alpha$ can be calculated according to the formula $$\text{Sine } \tfrac{1}{2}\alpha = \text{chord (pitch)/diameter } (P/A)$$

In the example given with a chord or pitch of 1.616 inches and a five toothed wheel it can be calculated that the pitch diameter (dimension A) is approximately 2.75 inches.

It will also be observed from the FIGURE 6 diagram that line 81 is tangent to circle 83 at a point 85. Point 85 is also the exact point at which the pin connection centerlines (points 60, 61) begin to depart from movement along their nominal path, i.e., line 81 is tangent to circle 83. If a diameter $a$ of circle 83 is then drawn through point 85 perpendicular to lines 80 and 81 and another line 86 parallel to this diameter is drawn at a distance equal to ½ of the pitch dimension P from line $a$, i.e., between the sprocket wheel centers, the former line 86 will intersect pitch diameter circle 83 at point 87 in the drawing. If a circle 88 is then drawn about point 87 having a radius 90 equal to the diameter $a$, there will thus be described an arcuate line or path having a dimension B. In the drawing, the round path may therefore be defined as the path B (heavy line) that the centerlines 31 of the rounds are forced to follow by the guide means 34–38 of the housing. That is, the guide means are so configured that the round centerlines follow a geometric path beginning at an initial point 91, whereat line 80 is tangent to a circle 88 having its center at point 87 and a radius 90 equal to the pitch diameter A (or circle diameter $a$). Path B ends, on the other hand, at a terminal point 92, which is defined by the radius line 90 bisecting angle $\alpha$ and passing through center point 87, i.e., line 90 is a secant of circle 88 or arc 91–92. The location of arcuate path B causes the belt pull centerline, or the centerline of the pin connections 60, 61, to follow a constant radial path about the sprocket drive shaft centerline, thus maintaining a constant linear, as well as angular, velocity with respect to the shaft r.p.m. The length of the arc B may also be determined in radians by the formula $$\text{rad.} = \pi\alpha/180°$$

The arcuate path B will naturally be duplicated, as indicated at B' in FIGURE 6, on the opposite side of the housing where the now empty belt leaves the exit sprocket wheel 16 to return to the entrance end of the conveyor housing to receive live rounds from the storage area, as shown in FIGURE 1. With the round path configuration just described it is now possible to load rounds into, or remove rounds from, the linked belt as it moves uniformly about the 180° bend in the conveyor mechanism, which greatly facilitates loading and unloading in the conveyor system adjacent the sprocket wheel periphery.

It will also be noted from FIGURE 4 that connecting pins 26 each include a central ball portion 26a which is received in a centrally located socket portion 28 of bore 30 of link ear portion 22c. This arrangement achieves a positive connection between the belt elements 12 such that the endless belt 10 may twist and adjacent elements fan or yaw, relative to the nominal round path 80 or 81, seen in FIGURE 6. Nevertheless, an accurate path distance along the straight line path is maintained and the relative distance between adjacent element pockets does not change. However, needed flexibility or slight movement in the horizontal plane about an axis perpendicular to the round path is still permitted to eliminate a need to take up any slack in starting belt drive, and avoid any piling up of elements when the driving force on the conveyor belt ceases.

It will be apparent that I have provided an improved ammunition conveyor mechanism wherein the pin connections between the elements of the endless ammunition belt are held at a constant radial dimension from the centerline of the sprocket wheel drive shaft which results in the conveyor belt moving more uniformly about the sprocket wheel. At the same time, the individual rounds of ammunition carried in the belt are forced to follow a constant path without any interference with uniform and smooth belt movement. Arcuate path B of the round is somewhat similar to a "gothic" arch and is a defined geometric path which results in a changing radial dimension as the round departs from its nominal straight line path (line 80) and begins to pivot about the sprocket wheel centerline ((point 42a) in the area of the wheel periphery, the defined path (arc B) finally merging (or becoming coaxial) with circle 83 at a point on the smaller circle defined by a radius, or secant, line 90 of the larger circle 88 which line bisects angle $\alpha$ and chord P.

While I have disclosed a preferred embodiment of this invention other modifications and variations will suggest themselves to those skilled in the art and it is intended to cover within the claims appended hereto all such changes as are within the scope and spirit of the invention as set forth herein.

What I claim as new and desire to secure by Letters Patent of the United States is:

1. An ammunition handling system including:
    a round carrying conveyor belt of the linked type;
    a pair of spaced, drive sprockets intermittently engaged with said belt for moving same; and
    guide means adapted to partially constrain the movement of said belt, said belt, drive sprockets and guide means being so structured and arranged, one with respect to the other in said system, that a two-dimensional path of the rounds moved in said system comprises,
- (a) a first series of points lying in a first line representing the nominal straight line path of said moving rounds, said first series of points lying in the longitudinal centerlines of said rounds,
- (b) a second series of points lying in a second line spaced from and parallel to said first line representing the connecting point centerlines of respective links of said linked type conveyor belt, wherein the distance between adjacent ones of said round centerlines and the distance between respective ones of the connecting point centerlines of each link are equal and comprise the pitch of said handling system conveyor belt, and
- (c) an arcuate segment of said two-dimensional path determined by
  - (1) an initial point of said arcuate segment, said initial point being located in said system at the intersection of a third line with said first line extending perpendicular thereto, and
  - (2) a terminal point of said arcuate segment, said terminal point being located in said system by a fourth line parallel to said third line and comprising a diameter of a first circle concentric with and having its diameter equal to the pitch diameter of said one of said drive sprockets, said fourth line being spaced from said third line at a distance equal to ½ of said belt pitch, said fourth line being collinear with the hypotenuse of a right triangle having an included angle ½α having its vertex at the center of said first circle wherein the adjacent side of said right triangle is collinear with a secant of a second circle having its center at the intersection of said third line and said first circle, said secant terminating said arcuate segment of said two-dimensional path so that said segment lies in said second circle.

2. A constant velocity conveyor mechanism for moving ammunition rounds along a prescribed path comprising:
a plurality of elements having round retaining pockets therein;
a means for pivotally interconnecting said elements adjacent the lateral edges thereof to form an endless belt;
a pair of spaced drive wheels, each wheel having peripheral sprockets intermittently engaged with said belt for moving individual elements of said belt between an ammunition storage area and a weapon spaced therefrom, said sprocket wheels each having
  - (1) a pitch diameter defined as twice the distance form the center of the wheel to the center of the opening between adjacent one of said sprockets and
  - (2) an angle α, defined by the formula 360°/number of sprockets wherein said angle has its vertex at the center of a first circle having a radius equal to ½ of said pitch diameter, said first circle and said wheel being concentric whereby said angle α subtends an arc of said first circle having a chord P;
a pair of guide members slidably engaging said belt at the longitudinal edges thereof and partially defining said prescribed path about said sprocket wheel centers, said prescribed path being two-dimensionally defined in said mechanism by
  - (3) a first series of points lying in a first line representing the nominal straight line path of rounds carried in said conveyor system, said first series of points lying in the longitudinal centerlines of said round retaining pockets, the distance between adjacent ones of said first series of points being equal to said chord P and comprising the pitch of said conveyor system belt,
  - (4) a second series of points lying on a second line spaced from and parallel to said first line and representing the nominal straight line path of the longitudinal centerlines of said element connecting means, adjacent one of said connecting means centerlines being equi-spaced laterally of each of said round pocket centerlines, the distance between adjacent ones of said second series of points also being equal to said chord P, and
  - (5) an arcuate segment of said prescribed path determined by (a) an initial point, said initial point being located by the intersection of a third line and said first straight line path perpendicular thereto, said third line being parallel to a fourth line comprising a diameter of said first circle and being located between said conveyor belt drive wheel centers at a distance equal to ½P from said fourth line, and (b) a terminal point, said terminal point being defined by a secant of a second circle having its center at the intersection of said third line and said first circle, wherein said secant bisects angle α, so that the hypotenuse of one of the right triangles formed by said bisection is collinear with said fourth line and the opposite side of said triangle is collinear with said chord,
whereby said path is symmetrical about said sprocket wheel centers, said guide members causing said rounds to move about said wheel centers at a uniform rate and said second series of points to maintain a constant radial distance from said centers whenever said elements are engaged with said sprocket wheels.

3. In an ammunition handling system including an endless linked belt type round carrying conveyor and a pair of powered sprocket wheels driving said conveyor, the improvement of guide means to achieve a more constant velocity movement of rounds in said system, said guide means comprising:
a housing having a first wall, a second wall spaced inwardly thereof to form a generally longitudinally extending round passage therebetween, and a pair of spaced support walls extending outwardly of said round passage and being adapted to support the sprocket wheels therebetween for intermittent engagement with the linked belt; and
secondary wall means on said support walls forming pairs of opposing channels adapted to slidingly engage said endless linked belt at the longitudinal edges thereof for guiding said belt along a two-dimensional path adjacent said wheels, wherein said path is partially defined by
  - (1) first and second spaced parallel lines representing the nominal straight line paths of the rounds and links, respectively, of said conveyor in a first longitudinal section of said passage, and a third line extending perpendicular thereto and intersecting said first line at an initial point of departure from said nominally straight line paths in said first housing passage section,
  - (2) a fourth line parallel to said third line and comprising a diameter of a first circle concentric with one of said sprocket wheels, said first circle diameter being equal to the pitch diameter of said one of said wheels, said third line being spaced from said fourth line a distance equal to one-half of the pitch of said linked belt, and (3) a fifth line comprising a radial line of a second circle having its center at the intersection of said third line and said first circle, said radial line passing through the center of said first circle, and bisecting an included angle $\alpha$, having its vertex at said center and one side thereof collinear with said fourth line, said angle $\alpha$ being equal to 360° divided by the number of sprocket teeth in said one wheel, whereby the intersection of said radial line and said second circle is the terminal point of a first arcuate segment beginning at said initial point and lying in said second circle.

4. The two-dimensional path of the invention according to claim 3 further including, a circular segment of said first circle extending between said terminal point of said first arcuate segment and a terminal point of a second arcuate segment comprising a mirror image of said first segment, said second arcuate segment likewise having an initial point of departure at the intersection of said third line and a similar one of a second pair of spaced parallel lines representing the nominal straight line paths of said rounds and links, respectively, in a second longitudinal section of said housing passage.

References Cited

UNITED STATES PATENTS 2,993,415   7/1961   Panicci et al. _____ 89—33

SAMULE FEINBERG, *Primary Examiner.*

S. C. BENTLEY, *Assistant Examiner.*